(12) United States Patent
Taylor

(10) Patent No.: US 8,070,119 B2
(45) Date of Patent: Dec. 6, 2011

(54) CLAMP ASSEMBLY FOR A STANDING SEAM

(76) Inventor: Peter Taylor, Bridgnorth (GB)

(\*) Notice: Subject to any disclaimer, the term of this patent is extended or adjusted under 35 U.S.C. 154(b) by 304 days.

(21) Appl. No.: 11/992,497

(22) PCT Filed: Sep. 15, 2006

(86) PCT No.: PCT/GB2006/003434
§ 371 (c)(1),
(2), (4) Date: Aug. 10, 2009

(87) PCT Pub. No.: WO2007/036693
PCT Pub. Date: Apr. 5, 2007

(65) Prior Publication Data
US 2010/0012805 A1 Jan. 21, 2010

(30) Foreign Application Priority Data
Sep. 28, 2005 (GB) .................................. 0519716.5

(51) Int. Cl.
*A47G 29/02* (2006.01)
(52) U.S. Cl. .............. 248/237; 248/229.13; 248/229.23; 248/228.4; 52/44; 52/544
(58) Field of Classification Search .................... 248/72, 248/237, 214, 229.13, 229.23, 228.1, 228.4; 182/45; 52/44, 543, 544, 24, 25, 26
See application file for complete search history.

(56) References Cited

U.S. PATENT DOCUMENTS
1,303,347 A * 5/1919 McFeaters ...................... 248/72
(Continued)

FOREIGN PATENT DOCUMENTS
| DE | 10026613 | 12/2001 |
|----|----------|---------|
| EP | 0952272 | 10/1999 |
| EP | 1126098 | 8/2001 |
| JP | 2001288863 | 10/2001 |
| JP | 2004124583 | 4/2004 |
| WO | 2004090256 | 10/2004 |

OTHER PUBLICATIONS
International Search Report Dec. 4, 2006.

*Primary Examiner* — Terrell McKinnon
*Assistant Examiner* — Bradley Duckworth
(74) *Attorney, Agent, or Firm* — Ira S. Dorman

(57) ABSTRACT

A clamp assembly is provided for securing an ancillary device (16) to a standing seam (8), the standing seam comprising a protruding web portion (10) with a head portion (12) at an outer extremity. The clamp assembly includes a substantially rigid member (18; 54) adapted to overlie and contact the head portion of the standing seam. First and second substantially rigid arms (22, 24; 58, 60) extend from the member and are adapted to embrace the head portion in co-operation with the member, at least one of the arms (24; 58, 60) being pivotally interconnected with the member at hinge means (28; 62, 64). The first and second arms have first and second free extremities (36, 38; 70, 72) adapted to face one another and to contact opposite sides of the web portion. Threaded fastener means (40, 41; 86) passes through the ancillary device and into a threaded aperture (46; 88) in the member, from an outer surface of the member. The hinge means permits pivoting of at least one of the first and second arms and separation of the first and second free extremities of the first and second arms, for locating the clamp assembly on the standing seam. The threaded fastener means is subsequently tightened to clamp the ancillary device and grip the web portion of the standing seam in jaw-like manner by the first and second free extremities of the first and second arms.

24 Claims, 6 Drawing Sheets

U.S. PATENT DOCUMENTS

| | | | |
|---|---|---|---|
| 2,708,557 A * | 5/1955 | Clark | 246/477 |
| 2,868,485 A * | 1/1959 | Friel | 248/59 |
| 5,535,973 A * | 7/1996 | Bailey et al. | 248/229.1 |
| 6,164,033 A * | 12/2000 | Haddock | 52/545 |
| 6,547,311 B1 * | 4/2003 | Derecktor | 296/100.12 |
| 7,240,770 B2 * | 7/2007 | Mullins et al. | 182/3 |
| 7,703,256 B2 * | 4/2010 | Haddock | 52/543 |
| 2010/0284737 A1 * | 11/2010 | McPheeters | 403/374.3 |

* cited by examiner

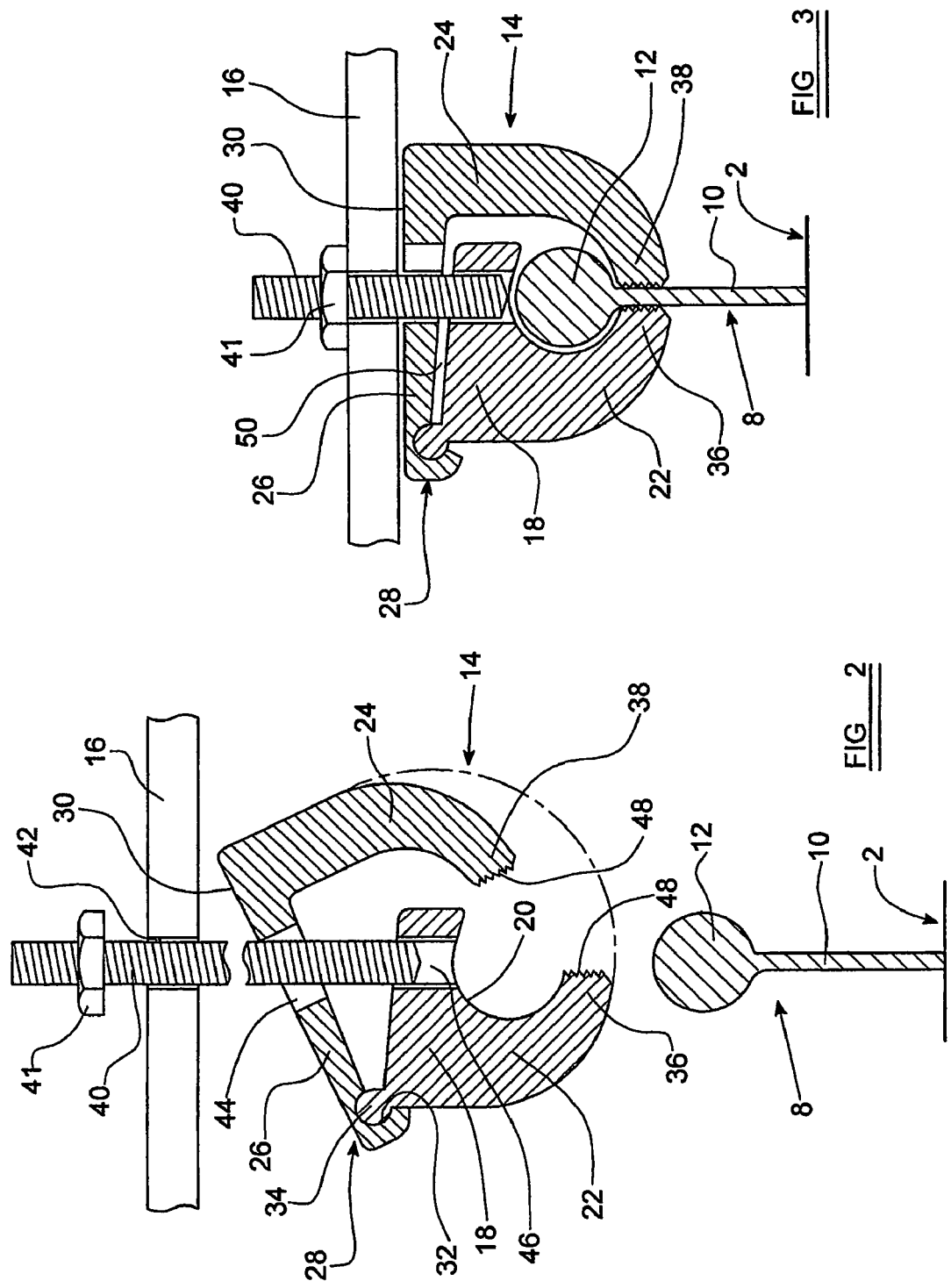

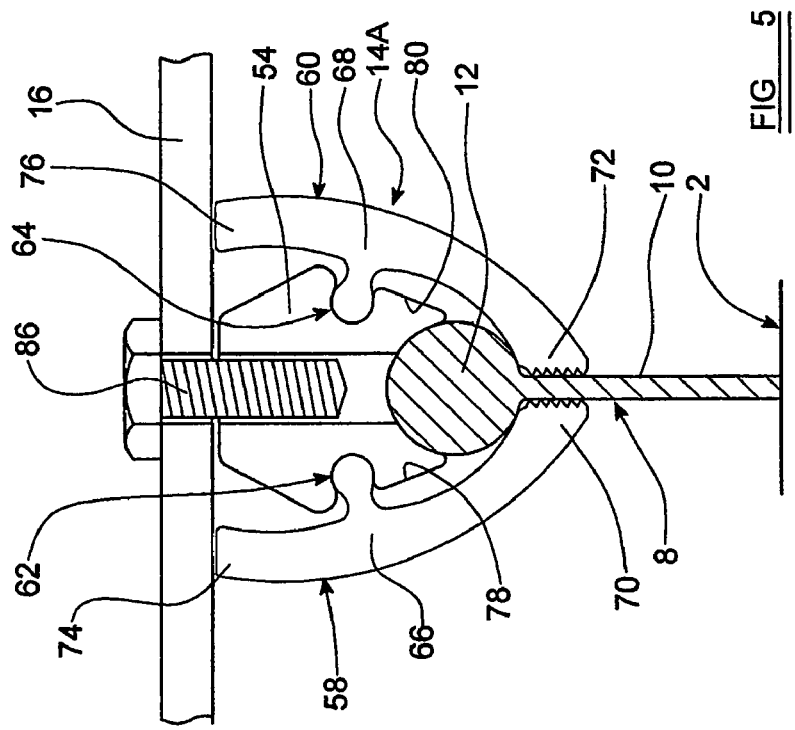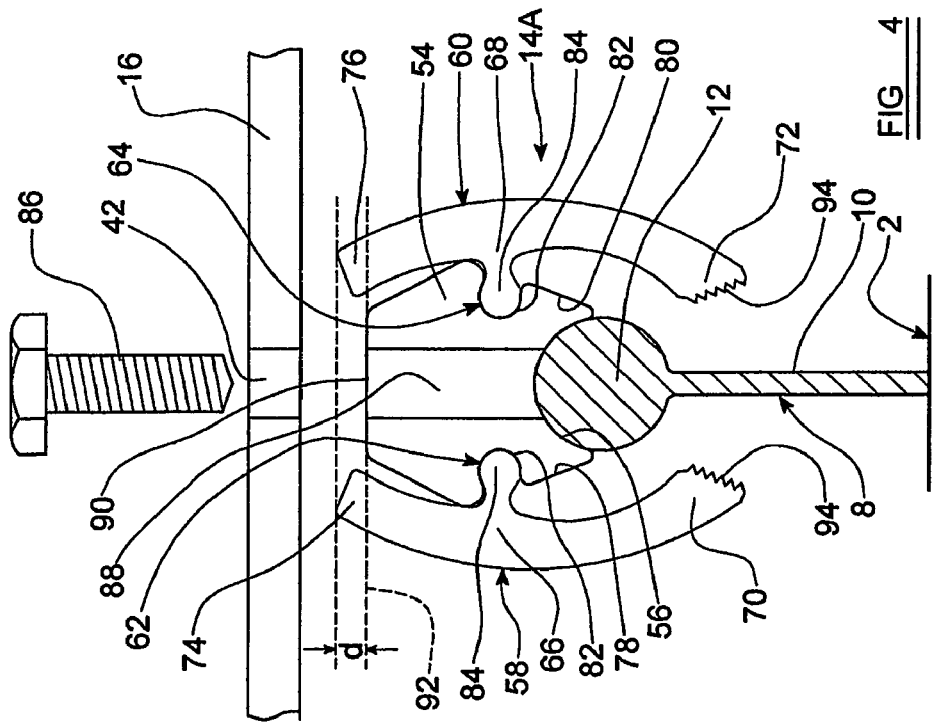

CLAMP ASSEMBLY FOR A STANDING SEAM

This invention relates to a clamp assembly for a standing seam.

Standing seams are well known for interconnecting metal panels which are particularly employed for covering roofs of various types of buildings. Typical standing seams comprise a protruding (e.g., upstanding) web portion formed by profiling adjacent edges of panels being interconnected and a correspondingly profiled head portion provided at an outer extremity of the web portion and adapted to effect interlocking of the adjacent panels. Such head portion may be of substantially cylindrical, or other, shape.

Requirements exist for fixing ancillary devices, such as fall arrest systems, walkways, aerials or posts, to standing seam roofs. It is important that fixing of such ancillary devices should not require penetration of the standing seam roof, because any holes formed may have a serious effect on the life of the roof. Consequently, it has been proposed to fix ancillary devices to the standing seams by means of clamps.

One particular clamp arrangement of the prior art is described in US Patent Publication No. 2004/0134151A1. The clamp of substantially U-shaped form is slid onto the standing seam, an insert is located between one leg of the clamp and one side of the web portion of the standing seam, and a threaded fastener is provided through a threaded aperture in the opposite leg of the clamp and tightened against the other side of the web portion of the standing seam. The ancillary device is secured to the top of the clamp. This clamp arrangement, and other arrangements of the prior art, is disadvantageous in that the threaded fastener, such as a bolt or grub screw, is located below the ancillary device to be fixed to the roof. This makes it particularly difficult to tighten the clamp securely to the standing seam. Furthermore, the threaded fastener engages directly with the web portion of the standing seam and rotation of the threaded fastener against the web portion may cause damage thereto. This arrangement of the prior art is also disadvantageous in that it requires the clamp and ancillary device to be secured in a number of stages to the standing seam. The clamp is initially loosely secured to the standing seam, the ancillary device is then secured to the clamp, and finally the clamp is readjusted and tightened against the standing seam. It is also quite difficult to position the clamp on the standing seam because the clamp has to be lowered onto the seam and the insert located before a key is inserted to tighten the threaded fastener. During this operation it is quite easy to drop the locking key.

It is an object of the present invention to overcome or minimise one or more of the aforementioned disadvantages of the prior art.

According to the present invention there is provided a clamp assembly for securing an ancillary device to a standing seam interconnecting metal panels, the standing seam comprising a protruding (for example, upstanding) web portion with a head portion at an outer (for example, upper) extremity thereof, the clamp assembly comprising: a substantially rigid member adapted to overlie and contact the head portion of the standing seam; first and second substantially rigid arms extending from the member and adapted to embrace the head portion of the standing seam in co-operation with the member, at least one of the arms being pivotally interconnected with the member at least one hinge means, the first and second arms having first and second free extremities thereof adapted to face one another and to contact opposite sides of the web portion of the standing seam; threaded fastener means adapted to pass through the ancillary device and into a complementary threaded aperture in the member, from an outer surface of the member; the at least one hinge means being adapted and arranged to permit pivoting of at least one of the first and second arms and separation of the first and second free extremities of the first and second arms, for locating the clamp assembly on the standing seam, the threaded fastener means being adapted to be subsequently tightened to effect clamping of the ancillary device and gripping of the web portion of the standing seam in jaw-like manner by the first and second free extremities of the first and second arms.

In a first embodiment of the present invention, the first arm forms an integral part of the member, without pivotal interconnection thereto, and the second arm has a portion which extends to overlie the member and is pivotally interconnected therewith at the hinge means, and adapted to receive the ancillary device, the threaded fastener means being adapted to pass through the ancillary device, through an aperture in the extending portion of the second arm and into the complementary threaded aperture in the underlying member, the hinge means being adapted and arranged to permit pivoting between the second arm, on its extending portion, and the first arm fixed to the member, for locating the clamp assembly on the standing seam, the threaded fastener means being adapted to be subsequently tightened to pivot the extending portion of the second arm towards the underlying member, whereby the first and second free extremities of the first and second arms are caused to converge to grip the web portion of the standing seam.

The member and the extending portion of the second arm may be suitably adapted and arranged whereby after locating the clamp assembly on the standing seam with the first and second free extremities of the first and second arms in contact with the web portion of the standing seam, a gap exists between the extending portion of the second arm and the member, which gap is adapted to be reduced or eliminated when the threaded fastener means is subsequently tightened.

The aperture in the extending portion of the second arm may be dimensioned to permit required separation of the first and second free extremities of the first and second arms, with the threaded fastener means loosely threaded into the threaded aperture in the member, to enable the clamp assembly to be located on the standing seam.

The extending portion of the second arm may have an outer surface of substantially planar form, to receive the ancillary device.

In a second embodiment of the present invention, the first and second substantially rigid arms are both pivotally interconnected, by respective hinge means, with opposite sides of the substantially rigid member at an intermediate location on the arms, the first and second arms having third and fourth free extremities respectively at opposite ends thereof to the first and second free extremities respectively, the third and fourth free extremities of the arms and an outer surface of the member being adapted to receive the ancillary device and the outer surface of the member being provided with the threaded aperture, the first and second arms being adapted and arranged such that when the ancillary device is not secured in contact therewith, the first and second arms are pivotable into a position whereby the first and second free extremities are separated to permit the clamp assembly to be located on the standing seam and the third and fourth free extremities extend angularly beyond a plane of the outer surface of the member, and such that when the ancillary device is subsequently secured by tightening the threaded fastener means, the first and second arms are pivoted by contact of the third and fourth free extremities thereof with the ancillary device, whereby the ancillary device is secured to the member, the third and fourth free extremities of the first and second arms being urged outwardly into coplanar relationship with the outer surface of the member, and the first and second free extremities of the first and second arms are urged towards each other and into secure gripping engagement with the web portion of the standing seam.

The at least one of the first and second arms may be curved, such as arcuate, form or may be L-shaped. The other arm may be substantially straight or may be of a similar complementary form. Where the arms are curved, the first and second arms may be adapted and arranged with respect to curvature such that they converge towards one another at the corresponding free extremities thereof.

In this second embodiment, the distance between the first and second free extremities of the first and second arms respectively and the respective intermediate locations may be greater than the distance between the third and fourth free extremities and the respective intermediate locations.

In this second embodiment, the substantially rigid member may be provided with outwardly-directed (for example, curved or angled) opposite side edges pivotally receiving the first and second arms. In this case, the substantially rigid member may be of generally hexagonal, optionally irregular, cross-sectional form.

The substantially rigid member may be internally contoured, at least in part, to substantially conform to the contour of the head portion of the standing seam.

The head portion of the standing seam may be substantially cylindrical or may be substantially oval or angular.

The first and/or second extremities of the first and/or second arms may be profiled to enhance grip thereof with the web portion of the standing seam, such as by providing serrations thereon or by surface roughening thereof.

The or each hinge means pivotally interconnecting the at least one of the first and second arms to the member may comprise a groove provided in the or each arm or the member into which is axially slid a complementary protrusion extending correspondingly from the member or the or each arm, the groove having a wall thereof subtending an angle of more than 180 degrees, whereby retention of the protrusion in the groove is obtained. The groove and/or the protrusion may be generally cylindrical.

The or each hinge means may have a pivotal axis adapted to be arranged substantially parallel to a length direction of the standing seam.

The substantially rigid member and the first and second substantially rigid arms may comprise metal, such as aluminium and may be provided as extruded forms.

The threaded fastener means may comprise a screw, bolt or stud and nut arrangement.

The substantially rigid member may be formed with more than one threaded aperture to receive a threaded fastener.

The ancillary device may have an aperture therein, such as a hole or slot, which may be of elongate form, for receiving the threaded fastener means.

The ancillary device may comprise or form part of a fall arrest system, a walkway, an aerial or a post, or may comprise or form part of a bracket for the attachment of other items.

The clamp assembly may be provided of a length selected according to a required application.

For a better understanding of the present invention and to show more clearly how it may be carried into effect, reference will now be made by way of example to the accompanying drawings in which:

FIG. 2 is a cross-sectional view of a first embodiment of a clamp assembly according to the present invention, and an ancillary device, prior to fixing to a standing seam of the roof of FIG. 1;

FIG. 3 is a cross-sectional view of the clamp assembly and ancillary device of FIG. 2, after fixing to the standing seam of the roof of FIG. 1;

FIG. 4 is a cross-sectional view of a second embodiment of a clamp assembly according to the present invention, and an ancillary device, prior to fixing to a standing seam of the roof of FIG. 1;

FIG. 5 is a cross-sectional view of the clamp assembly and ancillary device of FIG. 4, after fixing to the standing seam of the roof of FIG. 1.

Figure 1:
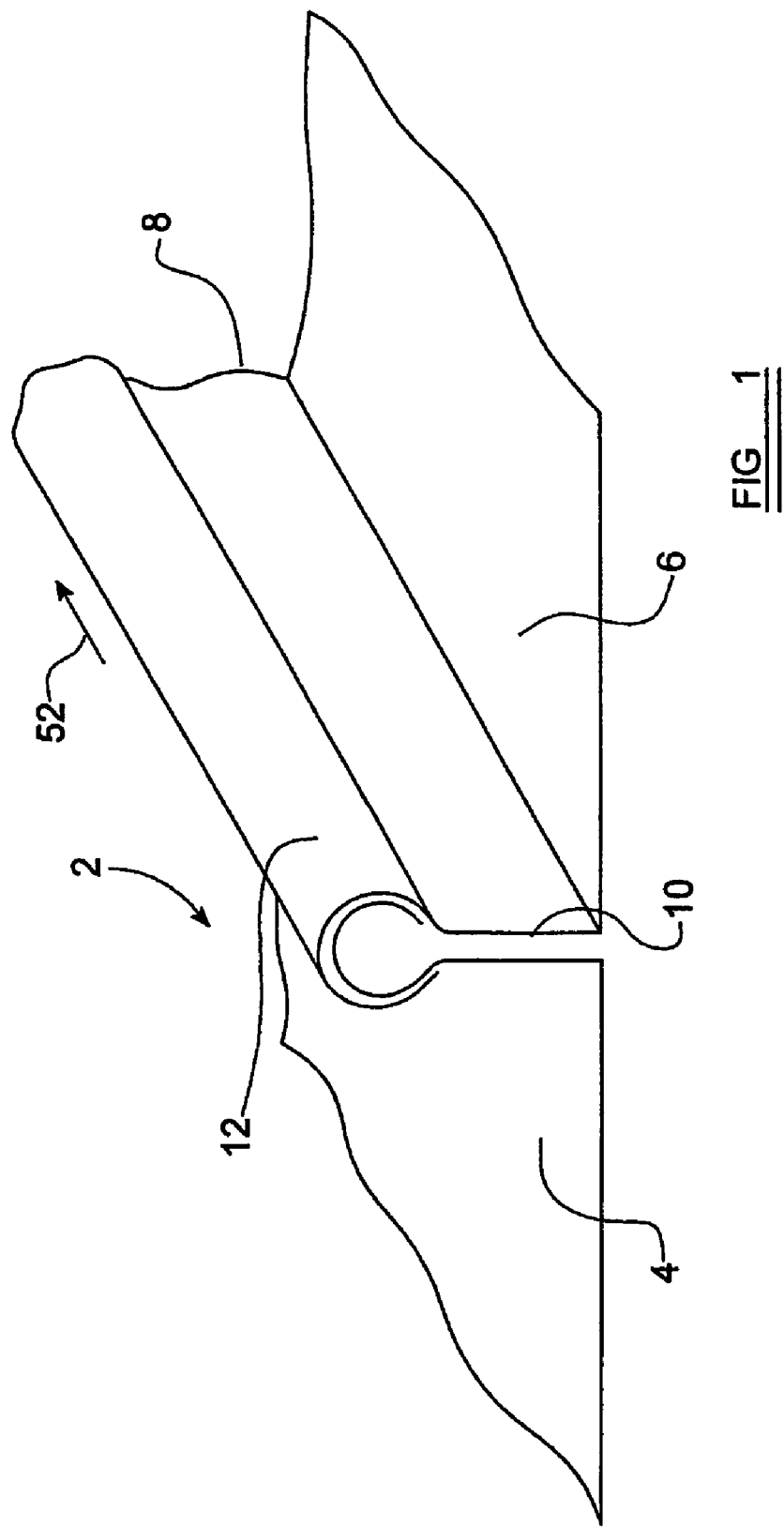
FIG. 1 is a perspective view of part of a standing seam roof.

Referring to FIG. 1, a standing seam roof 2 of a building comprises metal sheets 4, 6 interconnected by a standing seam 8. The standing seam 8 is formed by appropriately bending and profiling adjacent edges of the metal sheets 4, 6 and comprises an upstanding web portion 10 with a head portion 12 at an upper extremity thereof, interlocking the profiled edges of the sheets 4, 6 in known manner.

Referring also now to FIGS. 2 and 3, a clamp assembly 14 is provided according to the present invention for securing an ancillary device 16 to the standing seam 8 of the standing seam roof 2. The ancillary device 16 may, for example, comprise or form part of a fall arrest system, a walkway, an aerial or a post.

The clamp assembly 14 comprises a substantially rigid member 18 adapted to overlie and contact the head portion 12 of the standing seam 8. The member 18 is internally contoured 20, at least in part, to substantially conform to the contour of the head portion 12 of the standing seam 8, which in the particular embodiment shown is substantially cylindrical.

First and second substantially rigid arms 22, 24 extend from the member 18 and are adapted to embrace the head portion 12 of the standing seam 8 in cooperation with the member 18. The first arm 22 forms an integral part of the member 18, without any pivotal connection thereto. The second arm 24 has an upper portion 26 which extends to overlie the member 18 and is pivotally interconnected therewith at a hinge means 28. The upper extending portion 26 of the second arm 24 has a surface 30 adapted to receive the ancillary device 16 and suitably of substantially planar form.

The hinge means 28 suitably comprises a cylindrical groove 32, provided at an end region of the upper extending portion 26 of the second arm 24, into which is axially slid a complementary cylindrical protrusion 34 extending correspondingly from the member 18. The cylindrical groove 32 has a wall thereof subtending an angle of more than 180 degrees, whereby retention of the cylindrical protrusion 34 in the groove 32 is ensured. Alternatively, the cylindrical groove 32 may be provided in the member 18 and the cylindrical protrusion 34 may be correspondingly provided at the end of the upper extending portion 26 of the second arm 24.

The second arm 24 and the first arm 22 with the member 18 suitably comprise metal, such as aluminium and are suitably provided as extruded forms, including the cylindrical groove 32 and the cylindrical protrusion 34.

The first and second arms 22, 24 have first and second lower free extremities 36, 38 adapted to face one another and to contact opposite sides of the web portion 10 of the standing seam 8, when the clamp assembly 14 is fitted thereto.

A threaded stud 40 is arranged to pass through an aperture 42 in the ancillary device 16, through an aperture 44 in the upper extending portion 26 of the second arm 24 and into a complementary threaded aperture 46 in the underlying member 18. The aperture 42 in the ancillary device 16 is in the form of a hole or slot and may be of elongated form to facilitate fixing of the ancillary device 16. The aperture 44 in the upper extending portion 26 of the second arm 24 is dimensioned to permit the second arm 24 to be pivoted relative to the first arm 22 on the hinge means 28, to provide required separation of the first and second free extremities 36, 38 of the first and second arms 22, 24, with the threaded fastener 40 loosely in place, to enable the clamp assembly 14 to be located on the standing seam 8.

To install the clamp assembly 14 on the standing seam 8 with the ancillary device 16 secured thereto, the threaded fastener 40 is passed through the aperture 42 in the ancillary device 16, through the aperture 44 in the upper extending portion 26 of the second arm 24, and loosely threaded into the threaded aperture 46 in the member 18. The first and second arms 22, 24 are then pivoted relative to one another on the hinge means 28 to separate the first and second free extremities 36, 38 thereof. The assembly 14 is then located on the standing seam 8 and a nut 41 is threaded onto the stud 40 and tightened. During tightening, the member 18 is drawn towards the upper extending portion 26 of the second arm 24 and the first and second free extremities 36, 38 of the first and second arms 22, 24 are caused to converge and tightly grip the web portion 10 of the standing seam 8 in jaw-like manner. At the same time, the ancillary device 16 is tightly secured to the clamp assembly 14. The resulting completed assembly is shown in FIG. 3.

The first 36 and/or the second 38 free extremities of the first 22 and/or second 24 arms may be profiled 48 to enhance grip thereof with the web portion 10 of the standing seam 8, such as by providing serrations thereon or by surface roughening thereof.

As most clearly explained by reference to FIG. 3, the member 18 and the upper extending portion 26 of the second arm 24 are suitably adapted and arranged with respect to the hinge means 28 whereby, after locating the clamp assembly 14 on the standing seam 8 with the first and second free extremities 36, 38 of the first and second arms 22, 24 in contact with the web portion 10 of the standing seam 8, a gap 50 exists between the upper extending portion 26 and the member 18. This gap is adapted to be reduced or eliminated when the nut 41 is subsequently tightened on threaded fastener 40 and ensures tight gripping of the web portion 10 of the standing seam 8.

The hinge means 28 has a pivotal axis adapted to be arranged substantially parallel to a length direction 52 (FIG. 1) of the standing seam 8.

The clamp assembly 14 may be provided of any length, selected according to a required application.

FIGS. 4 and 5 show a further embodiment of a clamp assembly 14A according to the present invention and used to secure the ancillary device 16 to the standing seam 8.

Referring to FIG. 4, the further embodiment of clamp assembly 14A comprises a substantially rigid member 54 adapted to overlie and contact the head portion 12 of the standing seam 8. The member 54 is internally contoured 56 to substantially conform to the contour of the head portion 12 of the standing seam 8, which in the particular embodiment shown is substantially cylindrical.

First and second substantially rigid arms 58, 60 of complementary arcuate form are pivotally interconnected, by respective hinge means 62, 64, with opposite sides of the member 54, at intermediate locations 66, 68 on the arms 58, 60. The first and second arms 58, 60 extend downwardly from the intermediate locations 66, 68 respectively and curve such that they converge towards one another and are adapted to embrace the head portion 12 of the standing seam 8, in cooperation with the member 54. The first and second arms 58, 60 have first and second lower free extremities 70, 72 adapted to face one another and to contact opposite sides of the web portion 10 of the standing seam 8, when the clamp assembly 14A is fitted thereto.

The first and second arms 58, 60 extend upwardly from the intermediate locations 66, 68 respectively thereof and curve such that they converge towards one another. The first and second arms 58, 60 are arranged with third and fourth upper free extremities 74, 76 respectively.

The distance between the first and second free extremities 70, 72 of the first and second arms 58, 60 respectively and the respective intermediate locations 66, 68 may be greater than the distance between the third and fourth free extremities 74, 76 and the respective intermediate locations 66, 68.

The member 54 is suitably provided with outwardly-directed curved or angled opposite side edges 78, 80, pivotally receiving the first and second arms 58, 60. The member 54 may be of generally hexagonal cross-sectional form, which may be an irregular hexagonal form.

The hinge means 62, 64 each suitably comprises a groove 82, for example of cylindrical form, provided at the respective opposite side edges 78, 80 of the member 54, and into which is axially slid a complementary protrusion 84, for example of cylindrical form, extending from a respective first and second arm 58, 60 at its respective intermediate location 66, 68. Each of the grooves 82 has a wall thereof subtending an angle of more than 180 degrees, whereby retention of each protrusion 84 in its groove 82 is ensured. Alternatively, the grooves 82 may be provided in the arms 58, 60 and the protrusions 84 may be provided at the respective opposite side edges 78, 80 of the member 54.

The first and second arms 58, 60 and the member 54 suitably comprise metal, such as aluminium and are suitably provided as extruded forms, including the grooves 82 and the protrusions 84.

A threaded fastener 86, such as a screw or bolt, is arranged to pass through aperture 42 in the ancillary device 16 and into a complementary threaded aperture 88 in the member 54.

The member 54 has an upper surface 90 which, in association with the third and fourth upper free extremities 74, 76 of the first and second arms 58, 60, is adapted to receive the ancillary device 16.

When the ancillary device 16 is not secured in contact with the surface 90 of the member 54, the first and second arms 58, 60 are pivotable on their hinge means 62, 64 into a position whereby the first and second free extremities 70, 72 are separated to permit the clamp assembly 14A to be located on the standing seam 8. At this point, the third and fourth free extremities 74, 76 extend angularly by a distance d above a plane 92 of the upper surface 90 of the member 54.

When the ancillary device 16 is subsequently secured by tightening the threaded fastener 86, the first and second arms 58, 60 are caused to be pivoted by pressure contact of the ancillary device on the third and fourth free extremities 74, 76 of the arms 58, 60. The third and fourth free extremities 74, 76 of the arms 58, 60 are urged outwardly and downwardly into coplanar relationship with the upper surface 90 of the member 54 and the first and second free extremities 70, 72 of the arms 58, 60 are urged towards each other and into secure jaw-like gripping engagement with the web portion 10 of the standing seam 8. The resulting finished assembly is shown in FIG. 5.

The first 70 and/or the second 72 free extremities of the first 58 and/or the second 60 arms may be profiled 94 to enhance grip thereof with the web portion 10 of the standing seam 8, such as by providing serrations thereon or by surface roughening thereof.

The two hinge means 62, 64 are arranged to have pivotal axes thereof substantially parallel to one another and to a length direction 52 (FIG. 1) of the standing seam 8.

The clamp assembly 14A may be provided of a length selected according to a required application.

Figure 6:
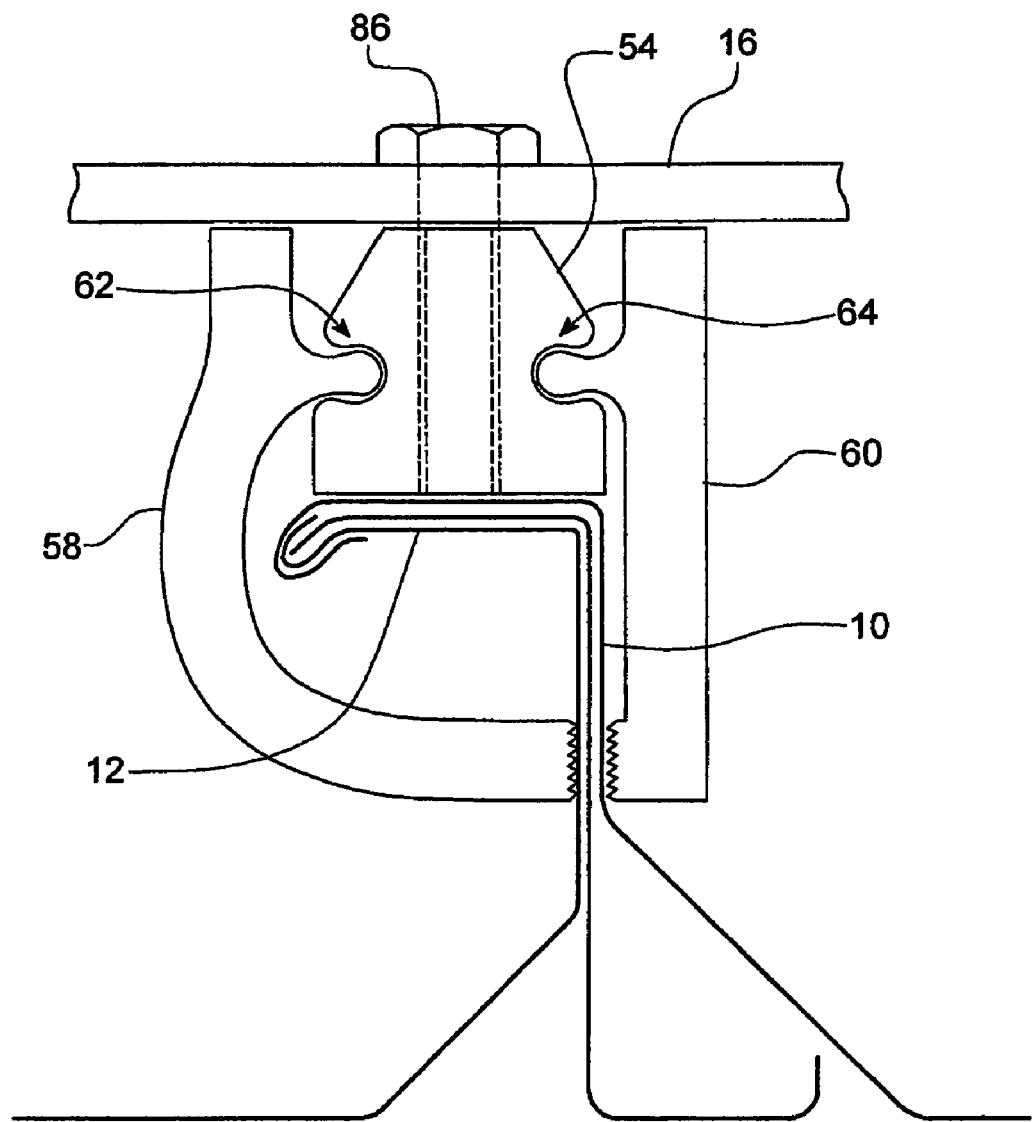
FIGS. 6 to 8 are views of further embodiments of clamp assemblies according to the present invention.

The clamp assembly shown in FIG. 6 is a modified version of the clamp assembly of FIGS. 4 and 5 and is adapted to a particular form of standing seam. For this purpose, the clamp assembly of FIG. 6 is provided with one arm which is substantially straight, while the other arm is substantially L-shaped.

Figure 7:
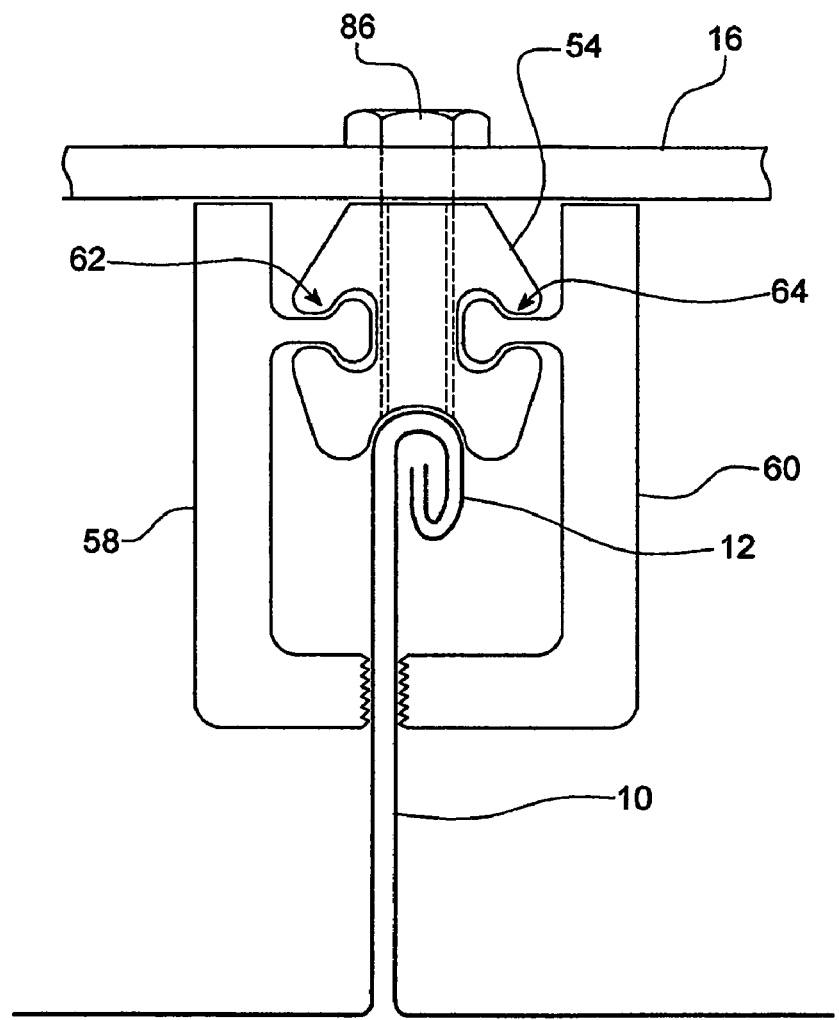

The clamp assembly shown in FIG. 7 is also a modified version of the clamp assembly of FIGS. 4 and 5 and is adapted to a further particular form of standing seam. For this purpose, the clamp assembly of FIG. 7 is provided with two arms which are substantially L-shaped, however the arms are of different dimensions so as to be spaced different distances from a slightly off-centre seam.

Figure 8:
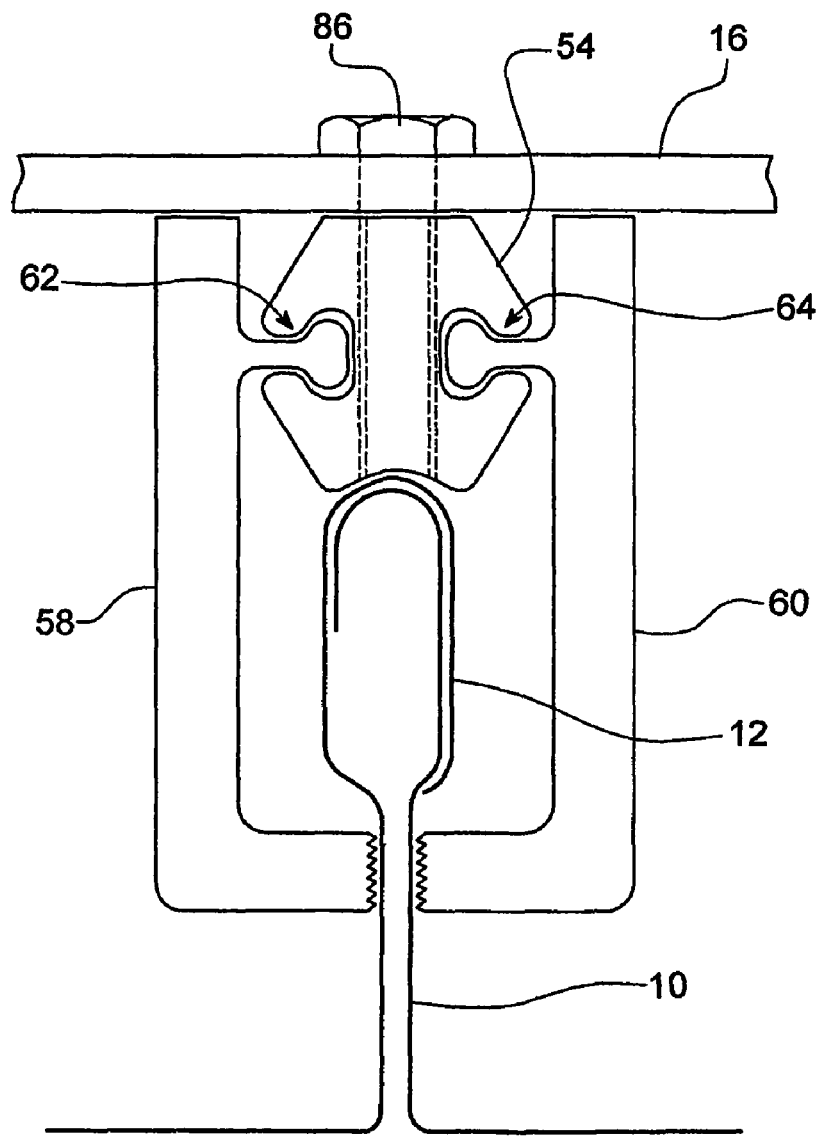

The clamp assembly shown in FIG. 8 is another modified version of the clamp assembly of FIGS. 4 and 5 and is adapted to a further particular form of standing seam. For this purpose, the clamp assembly of FIG. 8 is provided with two arms which are substantially L-shaped, the two arms being of complementary form.

The invention claimed is:

1. A clamp assembly for securing an ancillary device (16) to a standing seam (8) interconnecting metal panels (4, 6), the standing seam comprising a protruding web portion (10) with a head portion (12) at an outer extremity thereof, the clamp assembly comprising: a substantially rigid member (18); first and second substantially rigid arms (22, 24) extending from the member, at least one of the arms (24) being pivotally interconnected with the member at at least one hinge means (28), the first and second arms having first and second free extremities (36, 38), the first arm (22) forming an integral part of the member (18), without pivotal interconnection thereto, and the second arm (24) having a portion (26) which extends to overlie the member and is pivotally interconnected therewith at the hinge means (28), and adapted to receive the ancillary device (16); threaded fastener means (40, 41) engaging in a complementary threaded aperture (46) in the member, the threaded fastener means (40, 41) being adapted to pass through the ancillary device, through an aperture (44) in the extending portion of the second arm, and into the complementary threaded aperture (46) in the underlying member, wherein the or each hinge means (28) pivotally interconnecting the at least one of the first and second arms (22, 24) to the member (18) comprises a groove (32) provided in one of the or each arm and the member into which is axially slid a complementary protrusion (34) extending correspondingly from the other of the member and the or each arm, the groove having a wall thereof subtending an angle of more than 180 degrees, whereby retention of the protrusion in the groove is obtained, the hinge means being adapted and arranged to permit pivoting between the second arm, on its extending portion, and the first arm fixed to the member, for locating the clamp assembly on the standing seam, the threaded fastener means being adapted to be subsequently tightened to pivot the extending portion of the second arm towards the underlying member, whereby the first and second free extremities (36, 38) of the first and second arms are caused to converge to grip the web portion (10) of the standing seam (8).

2. A clamp assembly as claimed in claim 1, wherein the member (18) and the extending portion (26) of the second arm (24) are adapted and arranged whereby after locating the clamp assembly on the standing seam (8) with the first and second free extremities (36, 38) of the first and second arms (22, 24) in contact with the web portion (10) of the standing seam, a gap (50) exists between the extending portion of the second arm and the member, which gap is adapted to be reduced or eliminated when the threaded fastener means (40, 41) is subsequently tightened.

3. A clamp assembly as claimed in claim 1, wherein the aperture (44) in the extending portion (26) of the second arm (24) is dimensioned to permit required separation of the first and second free extremities (36, 38) of the first and second arms (22, 24), with the threaded fastener means (40, 41) loosely threaded into the threaded aperture (46) in the member (18), to enable the clamp assembly to be located on the standing seam (8).

4. A clamp assembly as claimed in claim 1, wherein the extending portion (26) of the second arm (24) has an outer surface (30) of substantially planar form, to receive the ancillary device (16).

5. A clamp assembly as claimed in claim 1, wherein the substantially rigid member (18) is internally contoured (20), at least in part, to substantially conform to the contour of the head portion (12) of the standing seam (8).

6. A clamp assembly as claimed in claim 1, wherein the first and/or second extremities (36, 38) of the first and/or second arms (22, 24) is profiled (48) to enhance grip thereof with the web portion (10) of the standing seam (8).

7. A clamp assembly as claimed in claim 1, wherein the or each hinge means (28) has a pivotal axis adapted to be arranged substantially parallel to a length direction (52) of the standing seam (8).

8. A clamp assembly as claimed in claim 1, wherein the substantially rigid member (18) overlies and contacts the head portion (12) of the standing seam (8).

9. A clamp assembly as claimed in claim 1, wherein the first and second arms (22, 24) embrace the head portion (12) of the standing seam (8) in co-operation with the member (18).

10. A clamp assembly as claimed in claim 1, wherein the threaded fastening means (40, 41) passes through the ancillary device (16) and into the aperture (46), whereby tightening of the threaded fastener means effects securing of the ancillary device (16) and gripping of the web portion (10) of the standing seam (8) in jaw-like manner by the first and second free extremities (36, 38) of the first and second arms (22, 24).

11. A clamp assembly for securing an ancillary device (16) to a standing seam (8) interconnecting metal panels (4, 6), the standing seam comprising a protruding web portion (10) with a head portion (12) at an outer extremity thereof, the clamp assembly comprising: a substantially rigid member (54); first and second substantially rigid arms (58, 60) extending from the member, at least one of the arms (58, 60) being pivotally interconnected with the member at at least one hinge means (62, 64), the first and second arms having first and second free extremities (70, 72); threaded fastener means (86) engaging in a complementary threaded aperture (88) in the member, wherein the or each hinge means (62, 64) pivotally interconnecting the at least one of the first and second arms (58, 60) to the member (54) comprises a groove (82) provided in one of the or each arm and the member into which is axially slid a complementary protrusion (84) extending correspondingly from the other of the member and the or each arm, the groove having a wall thereof subtending an angle of more than 180 degrees, whereby retention of the protrusion in the groove is obtained, and wherein the first and second substantially rigid arms (58, 60) are both pivotally interconnected, by respective hinge means (62, 64), with opposite sides of the substantially rigid member (54) at an intermediate location (66, 68) on the arms, the first and second arms having third and fourth free extremities (74, 76) respectively at opposite ends thereof to the first and second free extremities (70, 72) respectively, the third and fourth free extremities of the arms and an outer surface of the member being adapted to receive the ancillary device (16) and the outer surface of the member being provided with the threaded aperture (88), the first and second arms being adapted and arranged such that when the ancillary device is not secured in contact therewith, the first and second arms are pivotable into a position whereby the first and second free extremities are separated to permit the clamp assembly to be located on the standing seam and the third and fourth free extremities extend angularly beyond a plane of the outer surface of the member, and such that when the ancillary device is subsequently secured by tightening the threaded fastener means (86), the first and second arms are pivoted by contact of the third and fourth free extremities thereof with the ancillary device, whereby the ancillary device is secured to the member, the third and fourth free extremities of the first and second arms being urged outwardly into coplanar relationship with the outer surface of the member, and the first and second free extremities of the first and second arms are urged towards each other and into secure gripping engagement with the web portion (10) of the standing seam (8).

12. A clamp assembly as claimed in claim 11, wherein the at least one of the first and second arms (58, 60) has a shape selected from curved form and L-shaped.

13. A clamp assembly as claimed in claim 12, wherein the at least one curved arm (58, 60) is arcuate.

14. A clamp assembly as claimed in claim 12, wherein the other of the arms (58, 60) has a shape selected from substantially straight and a form substantially complementary to the one arm (58, 60).

15. A clamp assembly as claimed in claim 12, wherein where both arms (58, 60) are curved, the first and second arms are adapted and arranged with respect to curvature such that they converge towards one another at the corresponding free extremities (70, 72) thereof.

16. A clamp assembly as claimed in claim 11, wherein the distance between the first and second free extremities (70, 72) of the first and second arms (58, 60) respectively and the respective intermediate locations (66, 68) is greater than the distance between the third and fourth free extremities (74, 76) and the respective intermediate locations.

17. A clamp assembly as claimed in claim 11, wherein the substantially rigid member (54) is provided with outwardly-directed opposite side edges (78, 80) pivotally receiving the first and second arms (58, 60).

18. A clamp assembly as claimed in claim 17, wherein the substantially rigid member (54) is substantially hexagonal in cross-section.

19. A clamp assembly as claimed in claim 11, wherein the substantially rigid member (54) is internally contoured (56), at least in part, to substantially conform to the contour of the head portion (12) of the standing seam (8).

20. A clamp assembly as claimed in claim 11, wherein the first and/or second extremities (70, 72) of the first and/or second arms (58, 60) is profiled (94) to enhance grip thereof with the web portion (10) of the standing seam (8).

21. A clamp assembly as claimed in claim 11, wherein the or each hinge means (62, 64) has a pivotal axis adapted to be arranged substantially parallel to a length direction (52) of the standing seam (8).

22. A clamp assembly as claimed in claim 11, wherein the substantially rigid member (54) overlies and contacts the head portion (12) of the standing seam (8).

23. A clamp assembly as claimed in claim 11, wherein the first and second arms (58, 60) embrace the head portion (12) of the standing seam (8) in cooperation with the member (54).

24. A clamp assembly as claimed in claim 11, wherein the threaded fastening means (86) passes through the ancillary device (16) and into the aperture (88), whereby tightening of the threaded fastener means effects securing of the ancillary device (16) and ripping of the web portion (10) of the standing seam (8) in jaw-like manner by the first and second free extremities (70, 72) of the first and second arms (58, 60).

\* \* \* \* \*